United States Patent
Hsieh et al.

(10) Patent No.: US 8,275,179 B2
(45) Date of Patent: Sep. 25, 2012

(54) APPARATUS FOR CAPTURING A HIGH QUALITY IMAGE OF A MOIST FINGER

(75) Inventors: Ming Hsieh, South Pasadena, CA (US); Ankuo Wang, Santa Ana, CA (US); Fei Zhou, Shenzhen (CN); Wheshi Chen, Shenzhen (CN)

(73) Assignee: 3M Cogent, Inc., Pasadena, CA (US)

( * ) Notice: Subject to any disclaimer, the term of this patent is extended or adjusted under 35 U.S.C. 154(b) by 867 days.

(21) Appl. No.: 12/105,212

(22) Filed: Apr. 17, 2008

(65) Prior Publication Data

US 2008/0273771 A1 Nov. 6, 2008

Related U.S. Application Data

(60) Provisional application No. 60/915,363, filed on May 1, 2007.

(51) Int. Cl.
*G06K 9/00* (2006.01)
(52) U.S. Cl. ........................... 382/127; 382/124
(58) Field of Classification Search .............. 382/124, 382/128, 127
See application file for complete search history.

(56) References Cited

U.S. PATENT DOCUMENTS

| | | | |
|---|---|---|---|
| 4,137,565 A | 1/1979 | Mager et al. | |
| 4,315,310 A | 2/1982 | Bayliss et al. | |
| 4,569,080 A | 2/1986 | Schiller | |
| 4,784,484 A | 11/1988 | Jensen | |
| 4,833,724 A | 5/1989 | Goel | |
| 4,924,085 A * | 5/1990 | Kato et al. | 250/227.28 |
| 5,233,404 A | 8/1993 | Lougheed et al. | |
| 5,245,672 A | 9/1993 | Wilson et al. | |
| 5,307,345 A | 4/1994 | Lozowick et al. | |
| 5,416,573 A | 5/1995 | Sartor, Jr. | |
| 5,426,684 A | 6/1995 | Gaborski et al. | |
| 5,448,649 A | 9/1995 | Chen | |
| 5,517,419 A | 5/1996 | Lanckton et al. | |

(Continued)

FOREIGN PATENT DOCUMENTS

EP 0 098 607 7/1983

(Continued)

OTHER PUBLICATIONS

U.S. Appl. No. 60/357,557, entitled "Automatic Dredge System and Method of Operation," filed Feb. 15, 2002.

(Continued)

*Primary Examiner* — Bhavesh Mehta
*Assistant Examiner* — Utpal Shah

(57) ABSTRACT

An apparatus for capturing the image of a wet/moist fingerprint. The apparatus includes: a prism having an imaging plane on which a finger having valleys and ridges is place, a bottom plane parallel to the imaging plane and a reflective plane intercepting the imaging plane and intercepting the bottom plane at an angle α; a light source for generating a light with an incident angle of approximately 0° with respect to a surface normal of the imaging plane; and a lens for capturing light reflected from the reflective plane. The apparatus further includes an image sensor for generating an image of the valleys and ridges of the finger, wherein the reflective plane is arranged in such a way to meet the equation of $\alpha > 45 + (\arc\sin(n_1/n_2))/2$, where $n_1$ is a refraction index of medium filled between the valleys of the finger and the imaging plane, and $n_2$ is refraction index of the prism.

15 Claims, 2 Drawing Sheets

U.S. PATENT DOCUMENTS

| | | | |
|---|---|---|---|
| 5,528,355 A | 6/1996 | Maase et al. | |
| 5,579,278 A | 11/1996 | McLaury | |
| 5,596,454 A * | 1/1997 | Hebert | 359/726 |
| 5,613,014 A | 3/1997 | Eshera et al. | |
| 5,619,586 A | 4/1997 | Sibbald | |
| 5,621,516 A * | 4/1997 | Shinzaki et al. | 356/71 |
| 5,633,947 A | 5/1997 | Sibbald | |
| 5,751,836 A | 5/1998 | Wildes et al. | |
| 5,754,697 A | 5/1998 | Fu et al. | |
| 5,778,175 A | 7/1998 | Paul et al. | |
| 5,799,098 A | 8/1998 | Ort | |
| 5,809,180 A | 9/1998 | Kimura et al. | |
| 5,828,769 A | 10/1998 | Burns | |
| 5,828,773 A | 10/1998 | Setlak | |
| 5,887,079 A | 3/1999 | Endo et al. | |
| 5,900,993 A | 5/1999 | Betensky | |
| 5,937,090 A | 8/1999 | Kim | |
| 5,949,905 A | 9/1999 | Nichani et al. | |
| 5,996,061 A | 11/1999 | Lopez-Aguado | |
| 6,317,810 B1 | 11/1999 | Lopez-Aguado | |
| 6,002,815 A | 12/1999 | Immega et al. | |
| 6,011,860 A | 1/2000 | Fujieda | |
| 6,038,226 A | 3/2000 | Ellersick et al. | |
| 6,043,900 A | 3/2000 | Feng et al. | |
| 6,138,212 A | 10/2000 | Chiacchia | |
| 6,175,407 B1 | 1/2001 | Sartor | |
| 6,219,447 B1 | 4/2001 | Lee | |
| 6,249,360 B1 | 6/2001 | Pollard et al. | |
| 6,259,108 B1 | 7/2001 | Antonelli et al. | |
| 6,324,020 B1 | 11/2001 | Teng et al. | |
| 6,355,937 B2 | 3/2002 | Antonelli et al. | |
| 6,360,307 B1 | 3/2002 | Raftery et al. | |
| 6,384,832 B1 | 5/2002 | Muramatsu et al. | |
| 6,473,194 B1 | 10/2002 | Sakai | |
| 6,483,932 B1 | 11/2002 | Martinez et al. | |
| 6,505,905 B1 | 1/2003 | Krouss | |
| 6,618,076 B1 | 9/2003 | Sikthankar et al. | |
| 6,654,142 B1 | 11/2003 | Min | |
| 6,697,538 B1 | 2/2004 | Angenent et al. | |
| 6,870,538 B2 | 3/2005 | Macinnis | |
| 6,879,709 B2 | 4/2005 | Tian et al. | |
| 6,912,638 B2 | 6/2005 | Hellman | |
| 6,928,195 B2 | 8/2005 | Scott | |
| 6,934,409 B2 | 8/2005 | O'Hara | |
| 6,956,608 B1 * | 10/2005 | Shapiro et al. | 348/335 |
| 6,980,286 B1 | 12/2005 | Feng | |
| 6,993,165 B2 | 1/2006 | McClurg et al. | |
| 7,020,951 B2 | 4/2006 | Lin et al. | |
| 7,081,951 B2 | 7/2006 | Carver et al. | |
| 7,088,872 B1 | 8/2006 | Hsieh et al. | |
| 7,095,880 B2 | 8/2006 | Martinez et al. | |
| 7,194,393 B2 | 3/2007 | Wei et al. | |
| 7,203,344 B2 | 4/2007 | McClurg et al. | |
| 7,267,799 B1 | 9/2007 | Borich et al. | |
| 7,277,562 B2 | 10/2007 | Zyzdryn | |
| 7,315,632 B2 * | 1/2008 | Spycher et al. | 382/124 |
| 7,418,123 B2 | 8/2008 | Giger | |
| 7,564,495 B2 * | 7/2009 | Lee | 348/335 |
| 7,580,567 B2 | 8/2009 | Hsieh et al. | |
| 7,587,064 B2 | 9/2009 | Owechko et al. | |
| 7,616,788 B2 | 11/2009 | Hsieh et al. | |
| 7,639,858 B2 | 12/2009 | Ross et al. | |
| 7,796,266 B2 | 9/2010 | Cohen et al. | |
| 7,840,062 B2 | 11/2010 | Boroczky | |
| 7,876,934 B2 | 1/2011 | Georgescu et al. | |
| 7,912,528 B2 | 3/2011 | Krishnan | |
| 2001/0014066 A1 | 8/2001 | Koudo | |
| 2001/0038707 A1 | 11/2001 | Ohara | |
| 2002/0073211 A1 | 6/2002 | Lin et al. | |
| 2003/0013951 A1 | 1/2003 | Stefanescu et al. | |
| 2003/0025749 A1 | 2/2003 | Krouss | |
| 2003/0189571 A1 | 10/2003 | Macinnis et al. | |
| 2004/0046761 A1 | 3/2004 | Hellman et al. | |
| 2004/0088490 A1 | 5/2004 | Ghosh | |
| 2004/0102931 A1 | 5/2004 | Ellis et al. | |
| 2004/0114829 A1 | 6/2004 | LeFeuvre et al. | |
| 2004/0172238 A1 | 9/2004 | Choo | |
| 2005/0020903 A1 | 1/2005 | Krishnan et al. | |
| 2006/0224539 A1 | 10/2006 | Zhang et al. | |
| 2006/0245631 A1 | 11/2006 | Levenson et al. | |
| 2007/0140550 A1 | 6/2007 | Li et al. | |
| 2007/0183663 A1 | 8/2007 | Wang et al. | |
| 2007/0189582 A1 | 8/2007 | Hamza et al. | |
| 2007/0296863 A1 | 12/2007 | Hwang et al. | |
| 2008/0080768 A1 | 4/2008 | Li et al. | |
| 2008/0123931 A1 | 5/2008 | He et al. | |
| 2008/0159614 A1 | 7/2008 | He et al. | |
| 2008/0170770 A1 | 7/2008 | Suri | |
| 2008/0170778 A1 | 7/2008 | Luo | |
| 2008/0292194 A1 | 11/2008 | Schmidt et al. | |
| 2009/0060335 A1 | 3/2009 | Rodriguez Serrano et al. | |
| 2009/0116737 A1 | 5/2009 | Kiraly et al. | |
| 2009/0148010 A1 | 6/2009 | Boroczky | |
| 2009/0154814 A1 | 6/2009 | Natan | |
| 2009/0161928 A1 | 6/2009 | Khamene et al. | |
| 2009/0171240 A1 | 7/2009 | Aguilar et al. | |
| 2009/0185746 A1 | 7/2009 | Mian et al. | |
| 2009/0220148 A1 | 9/2009 | Levy et al. | |
| 2009/0268988 A1 | 10/2009 | Hsieh et al. | |
| 2009/0299999 A1 | 12/2009 | Loui | |
| 2010/0014718 A1 | 1/2010 | Savvides et al. | |
| 2010/0027852 A1 | 2/2010 | Hsieh et al. | |
| 2010/0049674 A1 | 2/2010 | Zohar | |
| 2010/0178204 A1 | 7/2010 | Yin et al. | |
| 2010/0304358 A1 | 12/2010 | Nie et al. | |
| 2012/0120233 A1 | 5/2012 | Li | |

FOREIGN PATENT DOCUMENTS

| | | |
|---|---|---|
| WO | 96/13742 | 10/1995 |
| WO | WO 01/18741 A1 | 3/2001 |
| WO | 2008/024778 | 2/2008 |

OTHER PUBLICATIONS

U.S. Appl. No. 60/915,363, entitled "Apparatus for Capturing a High Quality Image of a Moisten Finger," filed May 1, 2007.

Seul, Michael et al., "Practical Algorithms for Image Analysis," Cambridge University Press 2000, pp. 1-13.

Vincent, Luc, "Morphological Grayscale Reconstruction in Image Analysis: Applications and Efficient Algorithms," Transactions on Image Processing, vol. 2, No. 2, Apr. 1993, pp. 176-201.

Carlson, M.A., et al., "An Automated, Handheld Biosensor for Aflatoxin," Biosensors & Electronics 14 (2000), pp. 841-848.

Delmulle, Barbara S., et al., Development of an Immunoassay-Based Lateral Flow Dipstick for the Rapid Detection of Aflatoxin $B_1$ in Pig Feed, Journal of Agricultural and Food Chemistry, J. Agric. Food Chem. 2005, 53, pp. 3364-3368.

Tahir-Muhammad, Zarini, et al. "A Conductometric Biosensor for Biosecurity," Biosensors & Bioelectronics, Biosensors and Bioelectronics 18 (2003) pp. 813-819.

Niedbala, R. Sam, et al. "Detection of Analytes by Ummunoassay Using Up-Converting Phosphor Technology," Anal. Biochem. (2001), vol. 293, pp. 22-30.

* cited by examiner

APPARATUS FOR CAPTURING A HIGH QUALITY IMAGE OF A MOIST FINGER

CROSS-REFERENCE TO RELATED APPLICATION(S)

This Patent Application claims the benefit of the filing date of U.S. Provisional Patent Application Ser. No. 60/915,363, filed on May 1, 2007 and entitled "Apparatus For Capturing A High Quality Image Of A Moisten Finger," the entire content of which is hereby expressly incorporated by reference.

FIELD OF THE INVENTION

The present invention relates generally to finger print scanners, and more particularly to an apparatus for capturing a high quality image of a moist finger.

BACKGROUND

Typically, fingerprint capturing devices (readers) do not produce a good quality image when the finger being imaged is wet or has moisture on it. This is due to fingerprint image artifacts that lead to a degradation of the captured image. Typically the artifacts due to a moist finger result in bridging in the image between adjacent ridges R of a moist finger.

FIG. 1 shows a conventional fingerprint image capturing device. As shown in FIG. 1, the finger 1 is placed on the upper surface 2 of an optically transparent prism 3 (a glass, or plastic platen). The finger 1 is illuminated by a light source (not shown) positioned below the prism 3. The light 5 from the light source is incident on the finger surface placed on the prism 3 at an angle of incidence Φi. The reflected light from the prism 3 is then detected by a light detector (not shown). The aperture of the lens establishes the detection of the reflected light rays 4. In other words, the angle between the optical axis of the light detector and the line perpendicular to the prism surface 2 decides which light rays reach the detector (observation angle).

The angle of incidence that provides an angle of refraction of 90-degrees is known as the critical angle. Light will undergo total internal reflection for any angle of incidence greater than the critical angle. The components of the fingerprint imaging system are typically arranged in such a way that the angle of observation is greater than the critical angle for the interface between the prism and the air between the finger and the prism. The illumination source is also positioned in such a way that the generated light rays include a range of incidence angles including the angle of observation. From Snell law, the angle of incidence is equal to the angle of reflectance Φr, the range of angles of reflectance also includes the angle of observation.

Typically, the value of the critical angle at the interface between two materials depends on the index of refraction of those materials, $n_1$ and $n_2$. The index of refraction for air is approximately 1. The critical angle for the platen/air interface, based on the actual index of refraction of the platen material, forms a lower bound on the angle of observation and a limit on the angles of incidence. As a result, the orientation of the illumination source is also limited by the critical angle. Typically, the angle of observation is selected to be a bit larger than the critical angle.

Therefore, there is a need for an improved apparatus for capturing a high quality image of a moist finger.

SUMMARY

An apparatus for capturing the image of a wet/moist fingerprint. The apparatus includes: a prism having an imaging plane on which a finger having valleys and ridges is place, a bottom plane parallel to the imaging plane and a reflective plane intercepting the imaging plane and intercepting the bottom plane at an angle α; a light source for generating a light with an incident angle of approximately 0° with respect to a surface normal of the imaging plane; and a lens for capturing light reflected from the reflective plane. The apparatus further includes an image sensor for generating an image of the valleys and ridges of the finger, wherein the reflective plane is arranged in such a way to meet the equation of α>45+( arc sin $(n_1/n_2)$)/2, where $n_1$ is a refraction index of medium filled between the valleys of the finger and the imaging plane, and $n_2$ is refraction index of the prism.

In some embodiments, α is approximately in the rage of 73° to 80°. In one embodiment, $n_1$ is approximately equal to 1.33 for water, and $n_2$ is approximately equal to 1.76 for the prism. In some embodiments, the value of α can be changed by tilting the reflective plane via a knob, screw, spring, or other similar adjustment means

DETAILED DESCRIPTION

The present invention is directed to an apparatus for capturing the image of a fingerprint. The invention is capable of producing high quality images in the presence of wet/moist fingers. The invention produces better contrast images of wet/moist fingers and is substantially compact in size.

Figure 1:
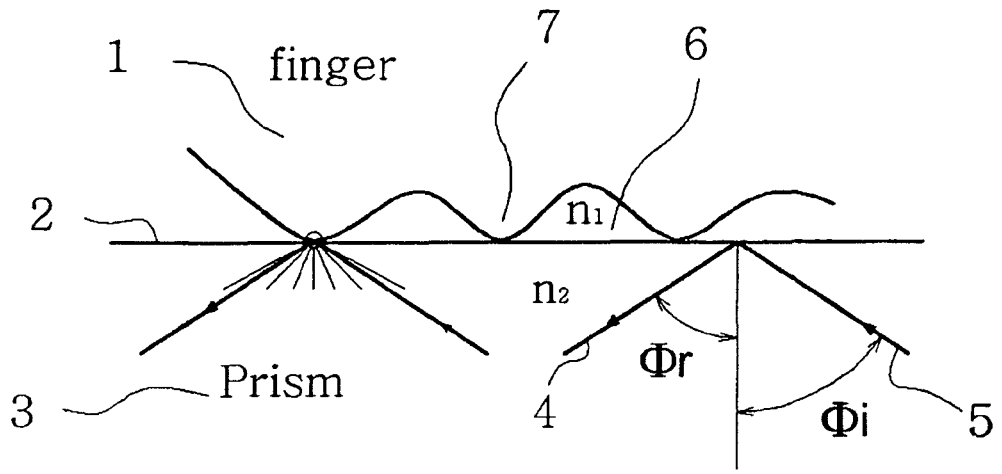
FIG. 1 shows a conventional fingerprint image capturing device.

Typically the surface topography of any finger can be approximated by a series of ridges R 7 and valleys V 6. The ridges touch the prism 3 and the valleys serve to form the boundaries of regions of air and/or moisture with the upper surface 2. The light 5 is totally internally reflected at those locations where air contacts the platen surface (valley regions) when the angles of incidence and observation are properly chosen. As shown in FIG. 1, light ray 5 is totally internally reflected at the prism/air interface 2 with the angle of incidence greater than the critical angle. The reflected light is then focused by the lens (not show) onto an image detector/sensor. As a result, the image of the valley regions is bright.

In locations where the ridges 7 contact the prism, total internal reflection does not occur. Instead, what is termed "frustrated total internal reflection" occurs. This is because the index of refraction of the finger is larger than that of air, so that the angle of incidence no longer corresponds to the critical angle for the relevant interface 2. As shown on the left side of FIG. 1, light incident on the surface of the glass at a location where a ridge R 7 is contacting the glass, the light is refracted through the prism/finger interface where it is partially absorbed and partially dispersed. In this case, a small fraction of the incident light is reflected back to the light detector at an angle of reflection $\Phi r$ equal to the angle of incidence $\Phi i$. As a result, the ridges R contribute a dark component to the image of the fingerprint. After detection, the fingerprint image can be permanently recorded for storage and/or further analysis.

In short, as shown in FIG. 1, a typical fingerprint image capturing apparatus is arranged in a way that the total internal reflection occurs at the valleys 6 of the finger 1. That is, the images of the valleys 6 are white, therefore, the background of the fingerprint image is also white. In this case, the angle of incidence $\Phi i$ is larger than the critical angle of the interface 2 between water/moisture and the prism. Such fingerprint imaging apparatus is capable of capturing fingerprint images which are free of artifacts caused by moisture.

However, on the ridges, the incident lights are scattered and there is a small fraction of lights that are focused by the lens onto the detector. This causes the images of the ridges not to be substantially black, that is, the contrasts of images produced by such apparatus are diminished or restricted.

Figure 2:
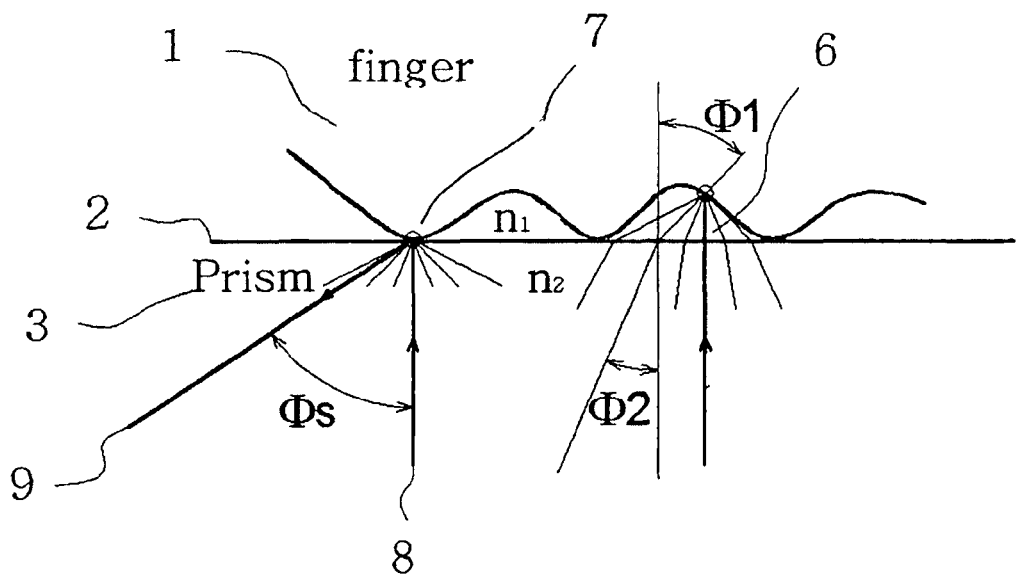
FIG. 2 shows an improved fingerprint image capturing device, according to some embodiments of the present invention.

FIG. 2 shows an improved fingerprint image capturing device depicting an exemplary arrangement of the components of the image capturing apparatus of the present invention, according to some embodiments of the present invention. In one embodiment, an incident light 8 is illuminated on the surface (imaging plane) 2 of a prism 3, and the light is then scattered on the ridges 7 and valleys 6 of the finger 1, because of normal incident light. However, there is a substantial difference between angle distributions of the scattered light occurring at ridges 7, and valleys 6. As shown in FIG. 2, for lights scattered at valleys 6, when they meet the upper portion of surface 2 of prism, a refraction occurs, where the refraction angle $\Phi_2$ is smaller than the critical angle of the interface of water/prism. The positions of lens, prism 3, and light source are properly arranged (with respect to each other), so that the angle of the collected light becomes lager than the critical angle of the interface of water/prism. Consequently, the scattered light from the valleys 6 will not enter the imaging system in its entirety. However, some of the scattered light from the ridges 7 is still collected by the light detector. As a result, bright image of ridges 7 and totally dark images of valleys 6 are obtained. That is, a sharper contrast image is obtained that is free of the artifacts caused by the presence of water, moisture, grease, or other contaminations.

Assuming that the refraction index of medium filled in the valley 6 is $n_1$ (for example, $n_1$ is 1.0 for air, and around 1.33 for water), and the refraction index of the prism 3 is $n_2$, the incident light 8 is scattered in the valleys 6, and refraction occurs when the scattered light meet the interface of the medium filled in the valley and the prism. The refraction angle is determined by the Snell law:

$$n_2 \sin \Phi_1 = n_2 \sin \Phi_2 \quad (1)$$

where, $\Phi_1$ is the incident angle and $\Phi_2$ is the refraction angle. As explained above, the refraction angle is no larger than the critical angle $\Phi_0$:

$$\Phi_0 = \arcsin(n_1/n_2), \text{ when } \Phi_1 = 90°. \quad (2)$$

Therefore, the lens of the device of the present invention is aligned to collect only the light scattered from the ridges with a scattering angle $\Phi_s$ lager than the critical angle $\Phi_0$. For example, a critical angle of $\Phi_0 = 49°$ is obtained using equation (2) by substituting $n_1 = 1.33$ for water, and $n_2 = 1.76$ for a type of flint glass at wavelength $\lambda = 850$ nm.

Figure 3:
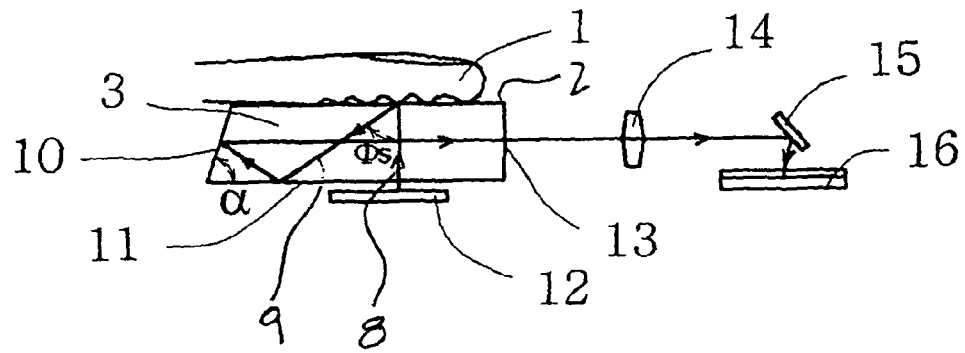
FIG. 3 shows an exemplary compact fingerprint image capturing device depicting light reflected from ridges of a finger, according to some embodiment of the present invention.

FIG. 3 shows an exemplary compact fingerprint image capturing device depicting light reflected from ridges of a finger, according to some embodiment of the present invention. In some embodiments, for a more compact and portable image capturing device, the light path can be folded by arranging the components of the device as shown in FIG. 3. The prism may be made from, for example, a flint glass, plastic, or the like. As indicated above, the critical angle for a water/prism interface is 49°. The angle between optical axis and the surface normal of imaging plane is appropriately chosen, for example, $\Phi_s = 56°$, for ensuring that the exit angle of all the scattered light from the effective window collected by the lens is larger than the critical angle ($\Phi_0 = 49°$). This way, when light source 12 illuminates on the imaging plane 2 of the prism 3, the scattered light from ridges meet the bottom plane 11 of the prism 3. The incident angle of the scattered light is larger than the critical angle of the air/glass (no moister between the ridges and the imaging plane) interface, which is 34.6° (based on equation 2) in this exemplary embodiment.

This results in a total internal reflection, because the critical angle and the arrangement of the lens and the light source are considered with respect to water (moisture).

The reflected lights then meet the reflective plane 10 of the prism 3 and are reflected into a lens 14 through the backend 13 of the prism. In one embodiment, the angle between bottom plane 11 and the reflective plane 10 of the prism 2 is $\alpha = 45° + \Phi_s/2 = 73°$. Once leaving the lens 14, the light is folded again by a folding mirror 15 to reduce the height of the device. Finally, the light is reflected onto an image sensor 16 and bright images of ridges are detected. In one embodiment, $\alpha$ is approximately in the rage of 73° to 80°.

Figure 4:
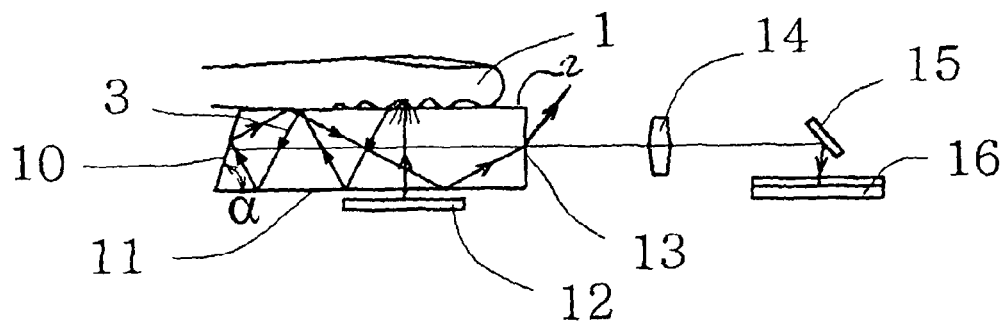
FIG. 4 shows an exemplary compact fingerprint image capturing device depicting light reflected from valleys of a finger, according to some embodiment of the present invention.

FIG. 4 shows an exemplary compact fingerprint image capturing device depicting light reflected from valleys of a finger, according to some embodiment of the present invention. As shown in FIG. 4, for a light scattered in a valley and refracted into prism 3, no total internal reflection occurs, that is, most part of the energy is refracted out of the prism and only a small fraction is reflected into prism again. This is because when the light meets the bottom plane 11 of the prism 3, there is no total internal reflection, because the incident angle is smaller than the critical angle. Even if such stray lights reach the backend of the prism, they will be blocked by the aperture stop of the lens and aperture. Since the light scattered in the valleys can not reach the image sensor/light detector, total black images of valley are formed, resulting in a high contrast image.

In some embodiments, prism 3 including the imaging plane 2, the reflective plane 10, and the bottom plane 11 are molded in a single prism component. In some embodiments, prism 3 can be made into different shapes to fold the light path for a more compact device.

Figure 5:
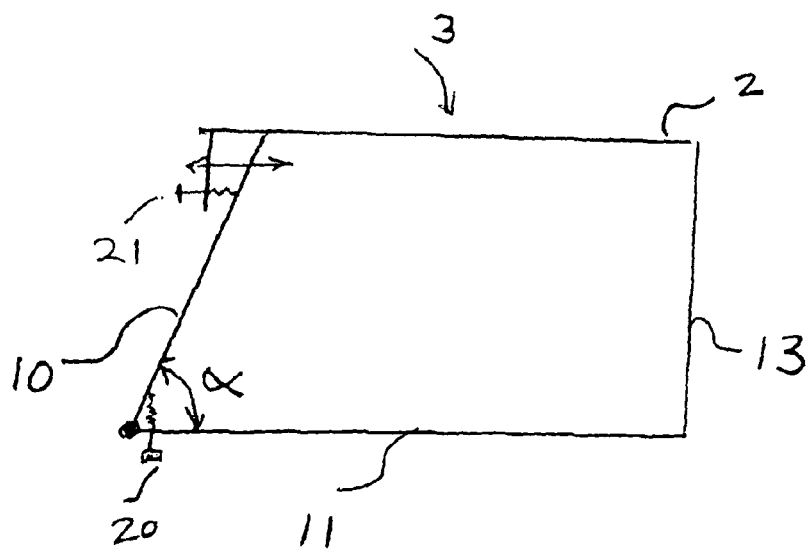
FIG. 5 shows an exemplary prism with adjustable reflective plane, according to some embodiment of the present invention.

FIG. 5 shows an exemplary prism with adjustable reflective plane, according to some embodiments of the present invention. In these embodiments, the orientation of the reflection plane 10 and thus the angle $\alpha$ is adjustable via a knob, screw, spring, or other adjustment means 20 or 21. This way, the adjustment means 20 tilts and thereby changes the orientation of the reflection plane 10 and thus the angle $\alpha$. This in turn changes the incident angle, so that different contrasts for the ridges and valleys may be captured by the image sensor 16 through lens 14.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention, as defined by the appended claims.

What is claimed is:

1. A fingerprint image capturing apparatus comprising:
a prism having an imaging plane on which a finger having valleys and ridges is placed, a bottom plane parallel to the imaging plane and a reflective plane intercepting the imaging plane and the bottom plane at an angle α;
a light source for generating a light with an incident angle of approximately 0° with respect to a surface normal of the imaging plane;
a lens for capturing light reflected from the reflective plane;
an image sensor for generating an image of the valleys and ridges of the finger; and
an adjuster for adjusting the reflective plane to change the value of α in such a way to meet the following equation:

$$\alpha > 45 + (\arcsin(n_1/n_2))/2,$$

where $n_1$ is a refraction index of medium filled between the valleys of the finger and the imaging plane, and $n_2$ is refraction index of the prism.

2. The fingerprint image capturing apparatus of claim 1, wherein α is approximately in the rage of 73° to 80°.

3. The fingerprint image capturing apparatus of claim 1, wherein $n_1$ is approximately equal to 1.33 for water, and $n_2$ is approximately equal to 1.76 for the prism.

4. The fingerprint image capturing apparatus of claim 1, further comprising a minor placed between the lens and the image sensor.

5. The fingerprint image capturing apparatus of claim 1, wherein the adjuster for adjusting the reflective plane is a knob, spring, or screw.

6. The fingerprint image capturing apparatus of claim 1, wherein the prism is made from glass.

7. The fingerprint image capturing apparatus of claim 1, wherein the prism is made from plastic.

8. A fingerprint image capturing apparatus comprising:
a prism having an imaging plane on which a finger having valleys and ridges is placed, a bottom plane parallel to the imaging plane and a reflective plane intercepting the imaging plane and the bottom plane at an angle α;
a light source for generating a light with an incident angle of approximately 0° with respect to a surface normal of the imaging plane;
a lens for capturing light reflected from the reflective plane; and
an image sensor for generating an image of the valleys and ridges of the finger, wherein the reflective plane is manually adjustable to change the value of α in such a way to meet the following equation:

$$\alpha > 45 + (\arcsin(n_1/n_2))/2,$$

where $n_1$ is a refraction index of medium filled between the valleys of the finger and the imaging plane, and $n_2$ is refraction index of the prism.

9. The fingerprint image capturing apparatus of claim 8, wherein α is approximately in the rage of 73° to 80°.

10. The fingerprint image capturing apparatus of claim 8, wherein $n_1$ is approximately equal to 1.33 for water, and $n_2$ is approximately equal to 1.76 for the prism.

11. The fingerprint image capturing apparatus of claim 8, further comprising a mirror placed between the lens and the image sensor.

12. The fingerprint image capturing apparatus of claim 8, further comprising means for manually adjusting the reflective plane to change the value of α.

13. The fingerprint image capturing apparatus of claim 12, wherein the means for adjusting the reflective plane is a knob, spring, or screw.

14. The fingerprint image capturing apparatus of claim 8, wherein the prism is made from glass.

15. The fingerprint image capturing apparatus of claim 8, wherein the prism is made from plastic.

* * * * *

UNITED STATES PATENT AND TRADEMARK OFFICE
CERTIFICATE OF CORRECTION

| | |
|---|---|
| PATENT NO. | : 8,275,179 B2 |
| APPLICATION NO. | : 12/105212 |
| DATED | : September 25, 2012 |
| INVENTOR(S) | : Hsieh et al. |

It is certified that error appears in the above-identified patent and that said Letters Patent is hereby corrected as shown below:

<u>Title Page 2, Item (56) References Cited, Column 2 (Other Publications):</u>

Line 24, delete "Ummunoassay" and insert -- Immunoassay --, therefor.

<u>In the Specifications:</u>

<u>Column 2</u>

Line 14, delete "rage" and insert -- range --, therefor.

<u>Column 2</u>

Line 19, delete "means" and insert -- means. --, therefor.

<u>Column 4</u>

Line 28, delete "rage" and insert -- range --, therefor.

<u>In the Claims:</u>

<u>Column 5</u>

In Claim 2, Line 21, delete "rage" and insert -- range --, therefor.

<u>Column 6</u>

In Claim 8, Line 10, delete "αin" and insert -- α in --, therefor.

Signed and Sealed this
Twenty-eighth Day of May, 2013

Teresa Stanek Rea
*Acting Director of the United States Patent and Trademark Office*

CERTIFICATE OF CORRECTION (continued)
U.S. Pat. No. 8,275,179 B2

Column 6

In Claim 9, Line 18, delete "rage" and insert -- range --, therefor.